(12) United States Patent
Yoon et al.

(10) Patent No.: US 9,731,777 B2
(45) Date of Patent: Aug. 15, 2017

(54) ACTIVE AIR SKIRT DEVICE FOR VEHICLE

(71) Applicants: Hyundai Motor Company, Seoul (KR); Hyundai Mobis Co., Ltd., Seoul (KR)

(72) Inventors: Jin Young Yoon, Gyeonggi-do (KR); Hyun Gyung Kim, Gyeonggi-do (KR); Dong Eun Cha, Gyeonggi-do (KR); Hak Lim Kim, Gyeonggi-do (KR); Keon Soo Jin, Ulsan (KR); Ki Hong Lee, Seoul (KR); Seong June Na, Gyeonggi-do (KR); Jang Ho Kim, Seoul (KR)

(73) Assignees: Hyundai Motor Company, Seoul (KR); Hyundai Mobis Co., Ltd., Seoul (KR)

( * ) Notice: Subject to any disclaimer, the term of this patent is extended or adjusted under 35 U.S.C. 154(b) by 32 days.

(21) Appl. No.: 15/049,381

(22) Filed: Feb. 22, 2016

(65) Prior Publication Data
US 2017/0120967 A1 May 4, 2017

(30) Foreign Application Priority Data
Oct. 30, 2015 (KR) .......................... 10-2015-0151934

(51) Int. Cl.
*B62D 35/00* (2006.01)
*F16H 1/20* (2006.01)

(52) U.S. Cl.
CPC ........... *B62D 35/005* (2013.01); *F16H 1/203* (2013.01)

(58) Field of Classification Search
CPC .............................. B62D 35/005; F16H 1/203
USPC ....................................................... 296/180.1
See application file for complete search history.

(56) References Cited

U.S. PATENT DOCUMENTS

| | | | | |
|---|---|---|---|---|
| 5,458,391 A * | 10/1995 | Ito | ........................ | B62D 35/005 296/180.1 |
| 6,079,769 A * | 6/2000 | Fannin | ................. | B62D 35/001 296/180.1 |
| 8,702,152 B1 * | 4/2014 | Platto | ................... | B62D 35/005 296/180.1 |
| 9,039,068 B2 * | 5/2015 | Niemi | .................... | B62D 35/02 296/180.1 |

FOREIGN PATENT DOCUMENTS

| | | |
|---|---|---|
| JP | H07-131669 A | 5/1995 |
| JP | 2527818 Y2 | 3/1997 |
| JP | 3094575 B2 | 10/2000 |
| JP | 2005-041387 A | 2/2005 |
| KR | 10-1997-0035459 A | 7/1997 |
| KR | 2004-0014780 A | 2/2004 |

* cited by examiner

*Primary Examiner* — Joseph D Pape
(74) *Attorney, Agent, or Firm* — Mintz Levin Cohn Ferris Glovsky and Popeo, P.C.; Peter F. Corless (57) ABSTRACT

An active air skirt device for a vehicle includes a first skirt and a second skirt, which are operated in multiple steps corresponding to a speed of the vehicle, so as to improve the aerodynamic characteristics of the vehicle corresponding to the speed of the vehicle.

14 Claims, 13 Drawing Sheets

ACTIVE AIR SKIRT DEVICE FOR VEHICLE

CROSS-REFERENCE TO RELATED APPLICATION

This application claims under 35 U.S.C. §119(a) the benefit of Korean Patent Application No. 10-2015-0151934, filed on Oct. 30, 2015 in the Korean Intellectual Property Office, the entire contents of which are incorporated by reference herein.

BACKGROUND

1. Field of the Invention

The present invention relates to an active air skirt device for a vehicle, and more particularly, to an active air skirt capable of being operated in multiple steps corresponding to a speed of the vehicle.

2. Description of the Related Art

As a vehicle moves through the air, it collides with air molecules and is affected by air resistance. The types of air resistance that act on a vehicle include drag force and lift force.

Drag force refers to resistance force that acts opposite to the motion of the vehicle moving through the air and colliding with air molecules, and lift force refers to force that results from the pressure difference between the top and underside of the body of a moving vehicle and acts to lift the vehicle body.

Therefore, a device for reducing drag force and lift force is required in order to improve the aerodynamic characteristics and fuel efficiency of vehicles.

As an exemplary device for improving the aerodynamic characteristics, an active air skirt device, which actively operates corresponding to a speed of a vehicle, has been developed. The active air skirt device is a device that reduces the amount of air flowing toward an underbody of the vehicle via a front bumper while traveling at a high speed, thereby reducing lift force and consequently improving the aerodynamic characteristics.

However, most common active air skirt devices have only two modes, namely a retracted mode and a full operating mode, which are selected corresponding to the speed of the vehicle, and thus have a shortcoming in that there is a limitation in the extent to which the aerodynamic characteristics of the vehicle can be improved corresponding to the speed of the vehicle.

The information disclosed in this Background of the Invention section is only for enhancement of understanding of the general background of the invention and should not be taken as an acknowledgement or any form of suggestion that this information forms the prior art already known to a person skilled in the art.

SUMMARY

It is an object of the present invention to provide an active air skirt device for a vehicle, which is capable of being operated in multiple steps corresponding to a speed of the vehicle, thereby more effectively correlating the aerodynamic characteristics of the vehicle to the speed of the vehicle and consequently improving the overall quality of the vehicle.

In accordance with an aspect of the present invention, the above and other objects can be accomplished by the provision of an active air skirt device for a vehicle, including a skirt housing secured to a front bumper of the vehicle so as to be concealed by the front bumper and not be exposed outside the front bumper, a first skirt mounted so as to be moved between a retracted mode, in which the first skirt is contained in the skirt housing, and an operating mode, in which the first skirt is protruded below the skirt housing, a second skirt mounted so as to be moved between a retracted mode, in which the second skirt is contained in the first skirt, and an operating mode, in which the second skirt is protruded below the first skirt, an actuator connected with the skirt housing and configured such that operation thereof is controlled by a controller, and a power transmission mechanism for connecting the actuator and the second skirt to transmit power from the actuator to the second skirt.

The active air skirt device for a vehicle may further include a first skirt guide mechanism for guiding vertical movement of the first skirt, the first skirt guide mechanism including a first guide housing secured to the skirt housing and having an opening formed in a bottom thereof, and a first moving rod inserted into the first guide housing so as to move vertically along the first guide housing and coupled to the first skirt.

The active air skirt device for a vehicle may further include a second skirt guide mechanism for guiding vertical movement of the second skirt, the second skirt guide mechanism including a second guide housing secured to the first skirt and having an opening formed in a bottom thereof, and a second moving rod inserted into the second guide housing so as to move vertically along the second guide housing and coupled to the second skirt.

The active air skirt device for a vehicle may further include a first skirt operating mechanism for assisting operation of the first skirt when the first skirt operates to be protruded below the skirt housing, the first skirt operating mechanism including a first cylinder secured to the skirt housing and having an opening formed in a bottom thereof, a first cylinder rod inserted into the first cylinder so as to move vertically along the first cylinder and coupled to the first skirt, and a first spring inserted into the first cylinder and having one end supported by a closed top of the first cylinder and the other end supported by the first cylinder rod, the first spring providing elastic force so that the first cylinder rod moves in a direction of being protruded from the first cylinder.

The active air skirt device for a vehicle may further include a second skirt operating mechanism for assisting operation of the second skirt when the second skirt operates to be protruded below the first skirt, the second skirt operating mechanism including a second cylinder secured to the first skirt and having an opening formed in a bottom thereof, a second cylinder rod inserted into the second cylinder so as to move vertically along the second cylinder and coupled to the second skirt, and a second spring inserted into the second cylinder and having one end supported by a closed top of the second cylinder and the other end supported by the second cylinder rod, the second spring providing elastic force so that the second cylinder rod moves in a direction of being protruded from the second cylinder.

The skirt housing may be located inside the front bumper, and may be secured to a front bumper back beam and a front-end module by a plurality of mounting brackets.

The skirt housing may include a front housing coupled to the mounting brackets, and a rear housing coupled to the front housing so that a housing space having an open bottom is defined between the front housing and the rear housing, the first skirt being mounted so as to move vertically using the housing space.

The first skirt may include a rear skirt, to which a lower end of the first cylinder rod is coupled, and a front skirt coupled to the rear skirt so that a skirt space having an open bottom is defined between the front skirt and the rear skirt, the second skirt being mounted so as to move vertically using the skirt space.

The controller may be configured to receive a signal from a speed sensor and control operation of the actuator.

The actuator may be a DC motor.

The power transmission mechanism may include a worm gear coupled to the actuator, a worm wheel gear tooth-engaged with the worm gear, a reduction gear tooth-engaged with the worm wheel gear, an output gear tooth-engaged with the reduction gear, an output shaft coupled to a center of the output gear, a rotating rod coupled to the output shaft and having blades extending in opposite directions from the output shaft, and a plurality of skirt cables, each having one end coupled to the blades of the rotating rod and the other end coupled to the second skirt after passing through the skirt housing and the first skirt.

The actuator housing may be secured to the skirt housing, the actuator may be secured to the actuator housing, and the worm gear, the worm wheel gear, the reduction gear, the output gear and the output shaft may be rotatably mounted.

An axial center of the output shaft may be located in the middle of the skirt housing in a lateral direction, and the skirt cables may be formed to have the same length from one end coupled to the blades of the rotating rod to the other end coupled to the second skirt.

The number of skirt cables coupled to one of the blades of the rotating rod may be the same as the number of skirt cables coupled to a remaining one of the blades.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference will now be made in detail to the preferred embodiments of the present invention, examples of which are illustrated in the accompanying drawings. Wherever possible, the same reference numbers will be used throughout the drawings to refer to the same or like parts.

An active air skirt device for a vehicle according to the present invention, as shown in FIGS. 1 through 17, includes a skirt housing 10 secured to a front bumper 1 of the vehicle so as to be concealed by the front bumper 1 and not be exposed outside the front bumper 1; a first skirt 20 mounted so as to be moved between a retracted mode, in which the first skirt 20 is contained in the skirt housing 10, and an operating mode, in which the first skirt 20 is protruded below the skirt housing 10; a second skirt 30 mounted so as to be moved between a retracted mode, in which the second skirt 30 is contained in the first skirt 20, and an operating mode, in which the second skirt 30 is protruded below the first skirt 20; an actuator 50 mounted so as to be connected with the skirt housing 10 and configured such that the operation thereof is controlled by a controller 40; and a power transmission mechanism 60 for connecting the actuator 50 and the second skirt 30 to transmit power from the actuator 50 to the second skirt 30.

The active air skirt device according to the present invention preferably is arranged such that the first skirt 20 and the second skirt 30 are operated in multiple steps corresponding to a speed of the vehicle. That is, when the vehicle is in a stationary state or travels at a low speed, both the first skirt 20 and the second skirt 30 are maintained in the retracted mode, in which they are contained in the skirt housing 10. When the vehicle travels at an intermediate speed, only the first skirt 20 is protruded below the front bumper 1, while the second skirt 30 is kept contained in the first skirt 20. When the vehicle travels at a high speed, both the first skirt 20 and the second skirt 30 are actuated into the full operating mode, in which they are protruded below the front bumper 1. The above-described operation of the first and second skirts 20 and 30 may further improve the aerodynamic characteristics of the vehicle, in particular, by correlating the aerodynamic characteristics to the speed of the vehicle.

The controller 40 is configured to receive a signal from a speed sensor 70 and control the operation of the actuator 50. Accordingly, the first skirt 20 and the second skirt 30 can actively operate corresponding to the speed of the vehicle.

It is preferable that the actuator 50 be embodied as a DC motor, which can achieve bidirectional rotation and is comparatively inexpensive, but the actuator is not limited to a DC motor.

The active air skirt device according to the present invention further includes a first skirt guide mechanism 80 for guiding the vertical movement of the first skirt 20.

The first skirt guide mechanism 80 includes a first guide housing 81 secured to the skirt housing 10 and having an opening formed in a bottom thereof, and a first moving rod 82, which is inserted into the first guide housing 81 so as to move vertically along the first guide housing 81 and is coupled to the first skirt 20.

The active air skirt device according to the present invention further includes a second skirt guide mechanism 90 for guiding the vertical movement of the second skirt 30.

The second skirt guide mechanism 90 includes a second guide housing 91 secured to the first skirt 20 and having an opening formed in a bottom thereof, and a second moving rod 92, which is inserted into the second guide housing 91 so as to move vertically along the second guide housing 91 and is coupled to the second skirt 30.

The active air skirt device according to the present invention further includes a first skirt operating mechanism 110 for assisting the operation of the first skirt 20 when the first skirt 20 operates to be protruded below the skirt housing 10.

The first skirt operating mechanism 110 includes a first cylinder 111, which is secured to the skirt housing 10 and has an opening formed in a bottom thereof, a first cylinder rod 112, which is inserted into the first cylinder 111 so as to move vertically along the first cylinder 111 and is coupled to the first skirt 20, and a first spring 113, which is inserted into the first cylinder 111 and has one end supported by a closed top of the first cylinder 111 and the other end supported by the first cylinder rod 112, thereby providing elastic force so that the first cylinder rod 112 moves in the direction of being protruded from the first cylinder 111.

The active air skirt device according to the present invention further includes a second skirt operating mechanism 120 for assisting the operation of the second skirt 30 when the second skirt 30 operates to be protruded below the first skirt 20.

The second skirt operating mechanism 120 includes a second cylinder 121, which is secured to the first skirt 20 and has an opening formed in a bottom thereof, a second cylinder rod 122, which is inserted into the second cylinder 121 so as to move vertically along the second cylinder 121 and is coupled to the second skirt 30, and a second spring 123, which is inserted into the second cylinder 121 and has one end supported by a closed top of the second cylinder 121 and the other end supported by the second cylinder rod 122, thereby providing elastic force so that the second cylinder rod 122 moves in the direction of being protruded from the second cylinder 121.

It is preferable that the first spring 113 and the second spring 123 be embodied as a compression spring, but, they are not limited to a compression spring.

Figure 3:
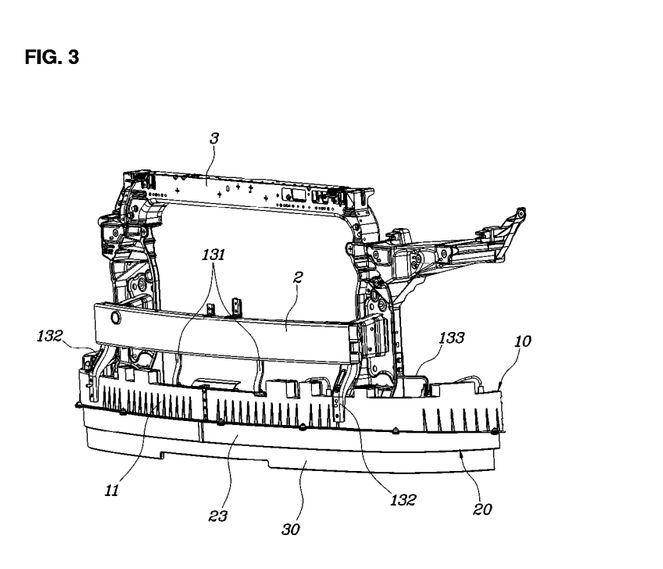
FIG. 3 is a view illustrating the state in which the air skirt device according to the present invention is coupled to a front bumper back beam and a front-end module by mounting brackets.
Figure 4:
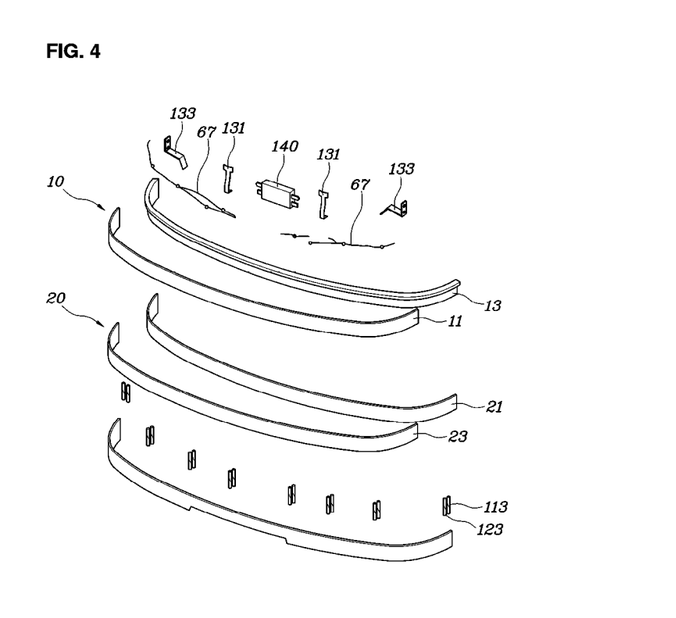
FIG. 4 is an exploded perspective view of the air skirt device according to the present invention.
Figure 5:
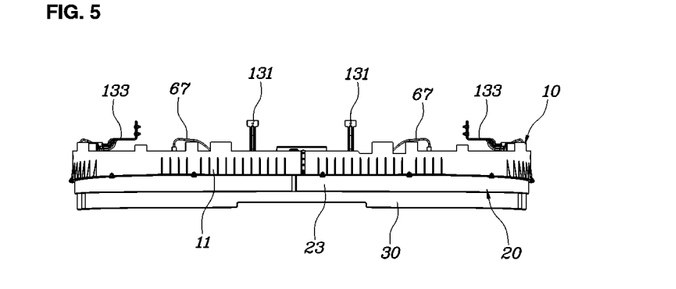
FIG. 5 is a front view illustrating the state in which a second skirt according to the present invention is operated.
Figure 6:
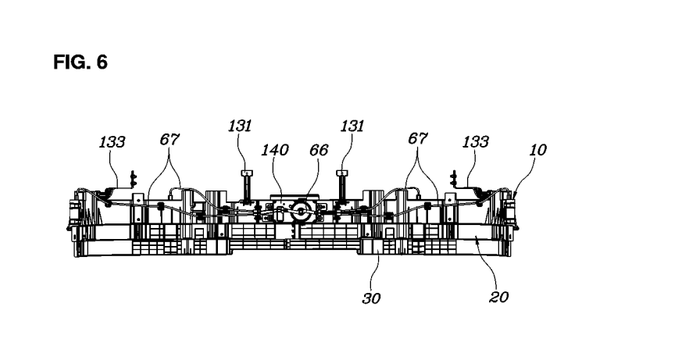
FIG. 6 is a rear view of FIG. 5.

The skirt housing 10 has a structure such that it is located inside the front bumper 1 and is secured to a front bumper back beam 2 and a front-end module 3 by a plurality of mounting brackets 131 and 132.

The front-end module 3 is a structure of the vehicle body to which a radiator, a cooling fan, etc. are mounted, and the front bumper back beam 2 extends in the lateral direction of the vehicle body and has both ends coupled to the front-end module 3.

Since the skirt housing 10 is secured to the front bumper back beam 2 and the front-end module 3 by a plurality of mounting brackets 131, 132 and 133, the active air skirt device has a secure mounting structure.

The skirt housing 10 includes a front housing 11 coupled to the mounting brackets 131 and 132, and a rear housing 13 coupled to the front housing 11 so that a housing space 12, which has an open bottom, is defined between the front housing 11 and the rear housing 13. The first skirt 20 can be moved vertically using the housing space 12.

The first skirt 20 includes a rear skirt 21, to which the lower end of the first cylinder rod 112 is coupled, and a front skirt 23, which is coupled to the rear skirt 21 so that a skirt space 22, which has an open bottom, is defined between the front skirt 23 and the rear skirt 21. The second skirt 30 can be moved vertically using the skirt space 22.

The first guide housing 81 and the first cylinder 111 are coupled to the front surface (the inner surface) of the rear housing 13, the first moving rod 82 is coupled to the rear surface (the outer surface) of the rear skirt 21, the second guide housing 91 and the second cylinder 121 are coupled to the front surface (the inner surface) of the rear skirt 21, and the first cylinder rod 112 is coupled to the lower end of the rear skirt 21.

The second moving rod 92 is coupled to the rear surface of the second skirt 30, and the second cylinder rod 122 is coupled to the lower end of the second skirt 30.

Figure 10:
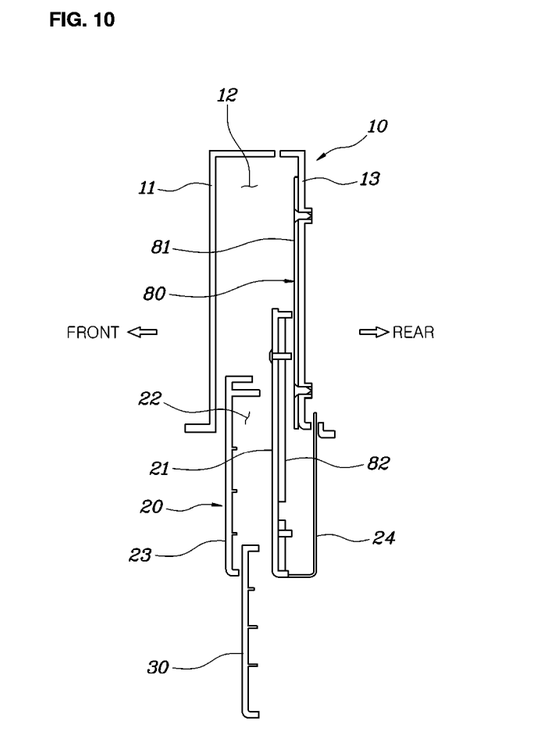
FIGS. 10 through 14 are sectional views taken along lines II-II, III-III, IV-IV, V-V, and VI-VI, respectively, in FIG. 9 to explain a coupling structure of a first skirt guide mechanism, a second skirt guide mechanism, a first skirt operating mechanism, a second skirt operating mechanism and skirt cables according to the present invention.
Figure 11:
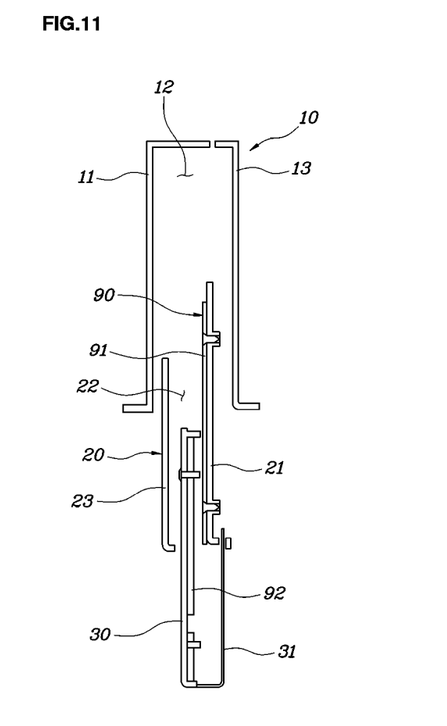
Figure 12:
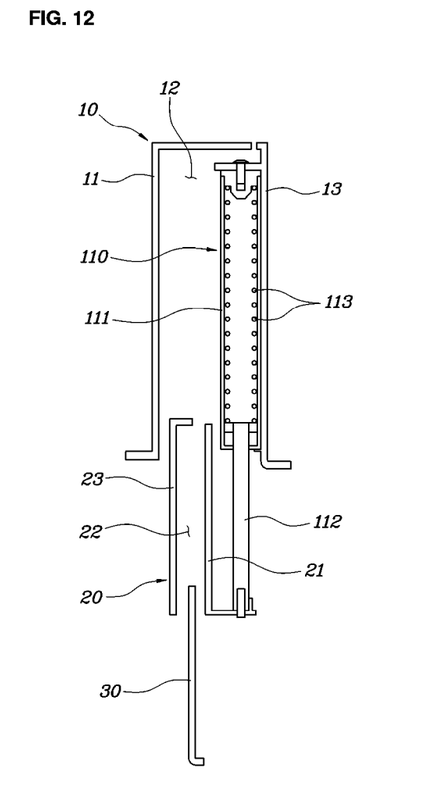
Figure 13:
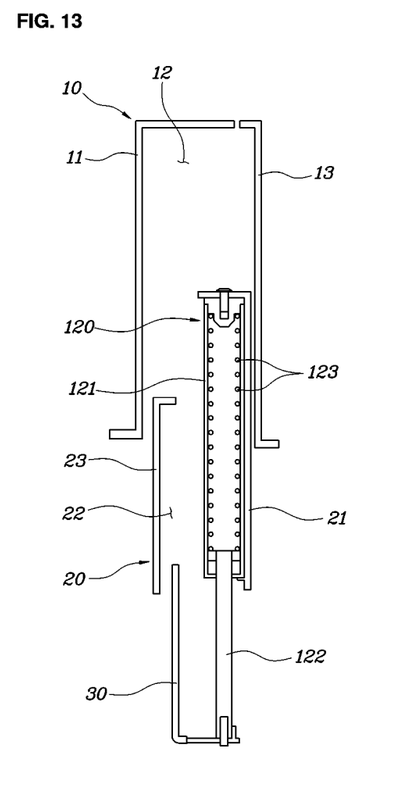
Figure 14:
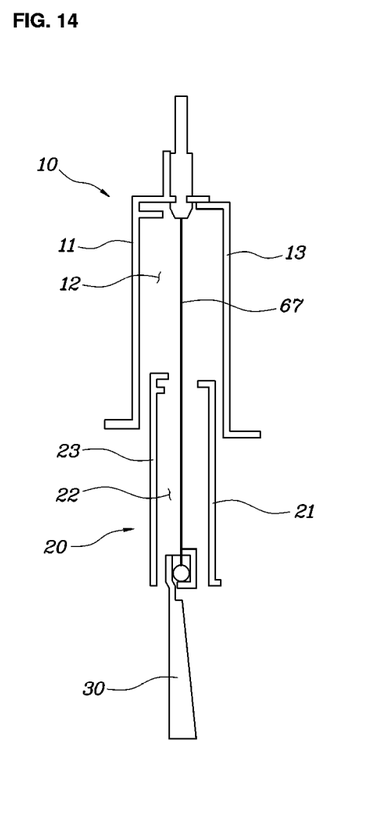

Reference numerals 24 and 31 in FIGS. 10 and 11 represent cover brackets for covering the first moving rod 82 and the second moving rod 92. When the first skirt 20 is in the operating mode, in which the first skirt 20 is protruded below the front bumper 1, the cover bracket 24 shields the first moving rod 82 from being exposed rearward. When the second skirt 30 is in the operating mode, in which the second skirt 30 is protruded below the front bumper 1, the cover bracket 31 shields the second moving rod 92 from being exposed rearward.

The cover bracket 24 has a lower end, which is coupled to the lower end of the rear skirt 21, and an upper end, which passes through the bottom of the rear housing 13, so as to be moved vertically with the rear skirt 21. The cover bracket 31 has a lower end, which is coupled to the lower end of the second skirt 30, and an upper end, which passes through the bottom of the rear skirt 21, so as to be moved vertically with the second skirt 30.

Figure 8:
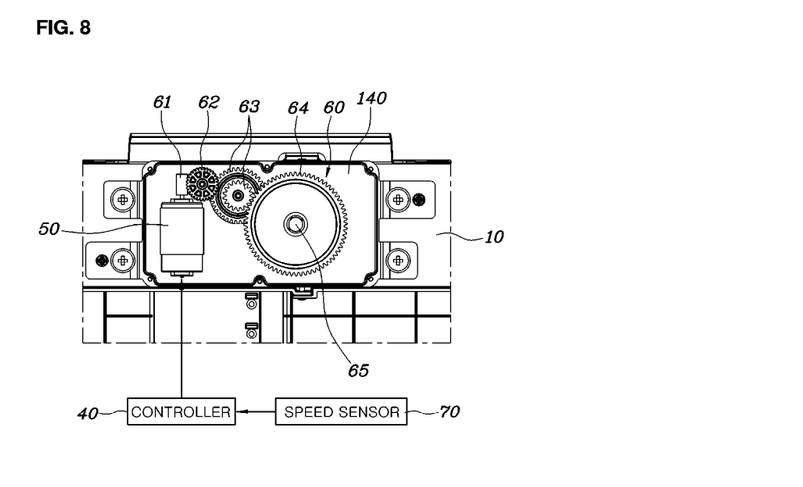
FIG. 8 is a view for explaining an actuator and a power transmission mechanism according to the present invention.
Figure 9:
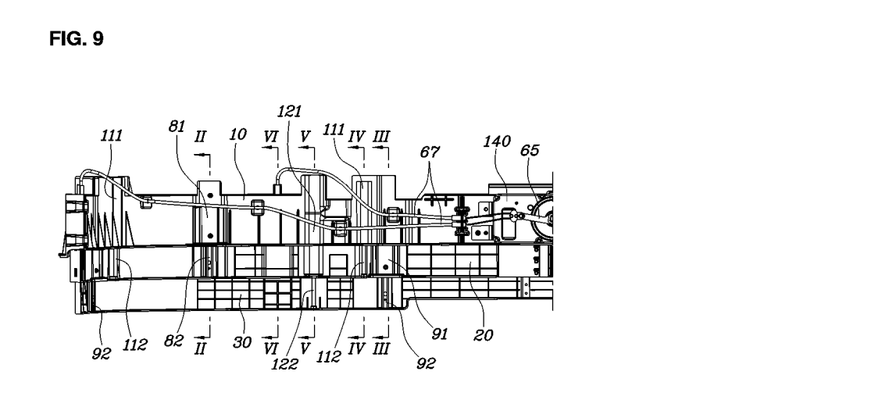
FIG. 9 is a view illustrating components positioned on the left side of an output shaft depicted in FIG. 6.

The power transmission mechanism 60 includes a worm gear 61 coupled to the actuator 50, a worm wheel gear 62 tooth-engaged with the worm gear 61, a reduction gear 63 tooth-engaged with the worm wheel gear 62, an output gear 64 tooth-engaged with the reduction gear 63, an output shaft 65 coupled to the center of the output gear 64, a rotating rod 66 coupled to the output shaft 65 and having blades 66a extending in opposite directions from the output shaft 65, and a plurality of skirt cables 67, each having one end coupled to the blades 66a of the rotating rod 66 and the other end coupled to the second skirt 30 after passing through the skirt housing 10 and the first skirt 20.

The actuator housing 140 is secured to the skirt housing 10, the actuator 50 is secured to the actuator housing 140, and the worm gear 61, the worm wheel gear 62, the reduction gear 63, the output gear 64 and the output shaft 65 are rotatably mounted.

The actuator 50, the worm gear 61, the worm wheel gear 62, the reduction gear 63, the output gear 64 and the output shaft 65 are shielded by the actuator housing 140 so as not to be exposed outside, and are protected from foreign materials on the road by the actuator housing 140, thereby improving durability.

The axial center of the output shaft 65 is located in the middle of the skirt housing 10 in the lateral direction. All of the skirt cables 67 are formed to have the same length from one end, which is coupled to the blades 66a of the rotating rod 66, to the other end, which is coupled to the second skirt 30. Further, the number of skirt cables 67 coupled to one blade 66a of the rotating rod 66 is set to be the same as the number of skirt cables 67 coupled to the other blade 66a. Accordingly, when the first skirt 20 and the second skirt 30 are operated by the actuator 50, the left portion and the right portion of the first skirt 20 and the second skirt 30 are moved at the same speed while being maintained in equilibrium about the output shaft 65, thereby enhancing the operational stability.

The state illustrated in FIGS. 1, 2, and 5 through 7 shows the full operating mode, in which both the first skirt 20 and the second skirt 30 are protruded below the front bumper 1. This full operating mode is maintained while a vehicle travels at a high speed, in which the amount of air that flows toward the underbody of the vehicle is reduced, thereby improving the aerodynamic characteristics of a vehicle.

Figure 15:
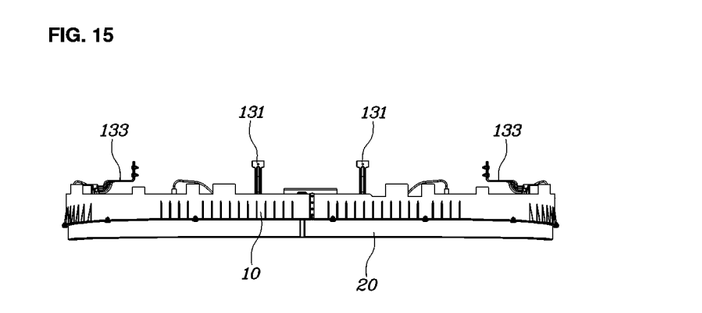
FIGS. 15 and 16 are front views illustrating the state in which a first skirt is operated, and the state in which an air skirt device is contained in a skirt housing, respectively.

The state illustrated in FIG. 15 shows an intermediate operating mode, in which only the first skirt 20 is protruded below the front bumper 1 and the second skirt 30 is contained in the first skirt 20. This intermediate operating mode is maintained while a vehicle travels at an intermediate speed, in which the amount of air that flows toward the underbody of the vehicle is also reduced, thereby improving the aerodynamic characteristics of a vehicle.

Figure 16:
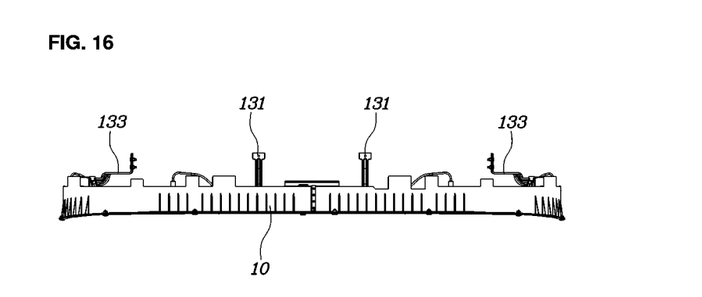
Figure 17:
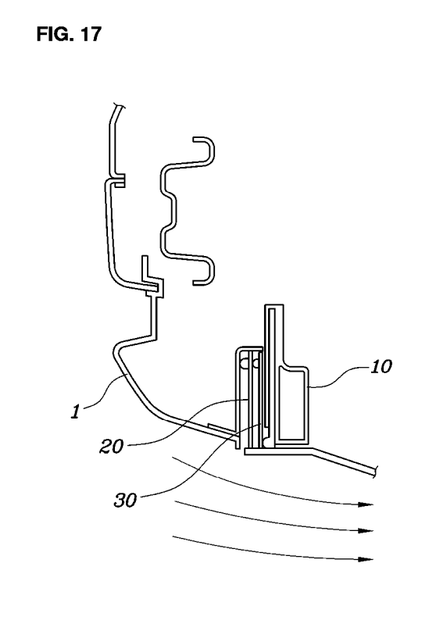
FIG. 17 is a sectional view illustrating the state in which the air skirt device according to the present invention is contained in a skirt housing.

The state illustrated in FIGS. 16 and 17 shows an initial mode, in which both the first skirt 20 and the second skirt 30 are contained in the skirt housing 10. This initial mode is maintained while a vehicle is stopped or travels at a low speed.

Figure 7:
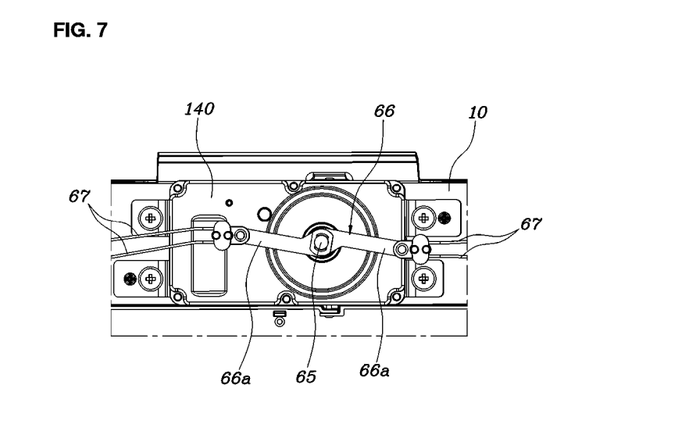
FIG. 7 is an enlarged view of a portion of FIG. 6, showing an actuator housing and a rotating rod coupled to each other.

In the initial mode, shown in FIGS. 16 and 17, the pair of blades 66a of the rotating rod 66 is rotated substantially 180 degrees from the state shown in FIG. 7 by the operation of the actuator 50, so that the left blade is moved to the right and the right blade is moved to the left. Therefore, the skirt cables 67, positioned at the left in FIG. 7, are pulled to the right, and the skirt cables 67, positioned at the right in FIG. 7, are pulled to the left.

If the skirt cables 67 are pulled toward the output shaft 65 as described above, the second skirt 30 is pulled upwards to be contained in the first skirt 20, and the first skirt 20, in which the second skirt 30 has been contained, is also pulled upwards to be contained in the skirt housing 10. In this way, the active air skirt device according to the present invention is maintained in the initial mode as shown in FIGS. 16 and 17.

From the above-described initial mode, if the speed of the vehicle is increased to a predetermined intermediate speed and the rotating rod 66 is rotated by the operation of the actuator 50 in response to the control of the controller 40, the pair of blades 66a is rotated substantially 90 degrees from the state shown in FIG. 7 and stands upright, and the left skirt cables 67 and the right skirt cables 67, which have been fully pulled toward the output shaft 65, are released halfway.

If the skirt cables 67 are released as described above, the first skirt operating mechanism 110 is operated in such a manner that the first cylinder rod 112 is protruded from the first cylinder 111 by the elastic force of the first spring 113, and the first skirt 20, coupled to the first cylinder rod 112, is protruded below the front bumper 1. In this way, the active air skirt device according to the present invention is maintained in the intermediate operating mode as shown in FIG. 15.

During the intermediate operating mode shown FIG. 15, the second skirt 30 is kept contained in the first skirt 20.

From the intermediate operating mode shown FIG. 15, if the speed of the vehicle is increased to a predetermined high speed and the rotating rod 66 is fully rotated by the operation of the actuator 50 in response to the control of the controller 40 so as to be turned into the state shown in FIG. 7, the left skirt cables 67 and the right skirt cables 67 are fully released.

Figure 1:
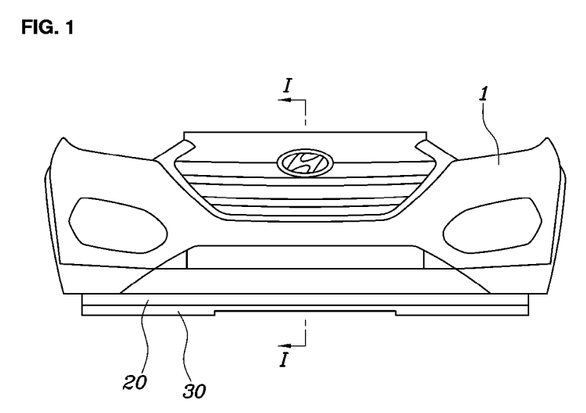
FIG. 1 is a front view of a front bumper of a vehicle, to which an air skirt device according to the present invention is mounted, and illustrates the state in which a second skirt is operated.
Figure 2:
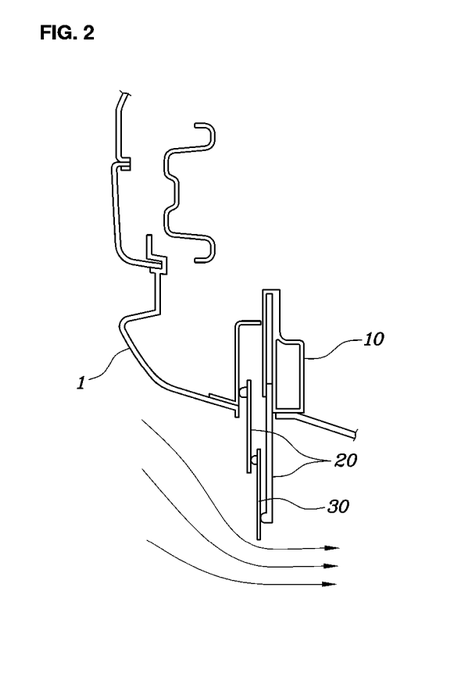
FIG. 2 is a sectional view taken along line I-I in FIG. 1.

If the skirt cables 67 are fully released as described above, the second skirt operating mechanism 120 is operated in such a manner that the second cylinder rod 122 is protruded from the second cylinder 121 by the elastic force of the second spring 123, and the second skirt 30, coupled to the second cylinder rod 122, is also protruded below the front bumper 1 together with the first skirt 20. In this way, the active air skirt device according to the present invention is maintained in the full operating mode as shown in FIGS. 1 and 2.

As is apparent from the above description, the present invention provides an active air skirt device for a vehicle, in which the first skirt 20 and the second skirt 30 are operated in multiple steps corresponding to the speed of the vehicle, thereby more effectively improving the aerodynamic characteristics of the vehicle in correlation to the speed of the vehicle, as compared with a conventional device having only two modes, namely a retracted mode and a full operating mode.

Further, the present invention provides an active air skirt device for a vehicle, in which the left skirt cables 67 and the right skirt cables 67 of the same length are provided in the same number on the left side and the right side of the output shaft 65, which is configured to be rotated by the actuator 50, and accordingly the left portion and the right portion of the first skirt 20 and the second skirt 30 are moved at the same speed while being maintained in equilibrium about the output shaft 65, thereby enhancing the operational stability of the air skirt device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An active air skirt device for a vehicle, comprising:
   a skirt housing secured to a front bumper of the vehicle so as to be concealed by the front bumper and not be exposed outside the front bumper;
   a first skirt mounted so as to be moved between a retracted mode, in which the first skirt is contained in the skirt housing, and an operating mode, in which the first skirt is protruded below the skirt housing;
   a second skirt mounted so as to be moved between a retracted mode, in which the second skirt is contained in the first skirt, and an operating mode, in which the second skirt is protruded below the first skirt;
   an actuator connected with the skirt housing and configured such that operation thereof is controlled by a controller; and
   a power transmission mechanism for connecting the actuator and the second skirt to transmit power from the actuator to the second skirt.

2. The active air skirt device according to claim 1, further comprising:
   a first skirt guide mechanism for guiding vertical movement of the first skirt,
   wherein the first skirt guide mechanism includes:
   a first guide housing secured to the skirt housing and having an opening formed in a bottom thereof; and
   a first moving rod inserted into the first guide housing so as to move vertically along the first guide housing and coupled to the first skirt.

3. The active air skirt device according to claim 1, further comprising:
   a second skirt guide mechanism for guiding vertical movement of the second skirt,
   wherein the second skirt guide mechanism includes:
   a second guide housing secured to the first skirt and having an opening formed in a bottom thereof; and
   a second moving rod inserted into the second guide housing so as to move vertically along the second guide housing and coupled to the second skirt.

4. The active air skirt device according to claim 1, further comprising:
   a first skirt operating mechanism for assisting operation of the first skirt when the first skirt operates to be protruded below the skirt housing,
   wherein the first skirt operating mechanism includes:
   a first cylinder secured to the skirt housing and having an opening formed in a bottom thereof;
   a first cylinder rod inserted into the first cylinder so as to move vertically along the first cylinder and coupled to the first skirt; and
   a first spring inserted into the first cylinder and having one end supported by a closed top of the first cylinder and the other end supported by the first cylinder rod, the first spring providing elastic force so that the first cylinder rod moves in a direction of being protruded from the first cylinder.

5. The active air skirt device according to claim 1, further comprising:
   a second skirt operating mechanism for assisting operation of the second skirt when the second skirt operates to be protruded below the first skirt,
   wherein the second skirt operating mechanism includes:
   a second cylinder secured to the first skirt and having an opening formed in a bottom thereof;
   a second cylinder rod inserted into the second cylinder so as to move vertically along the second cylinder and coupled to the second skirt; and
   a second spring inserted into the second cylinder and having one end supported by a closed top of the second cylinder and the other end supported by the second cylinder rod, the second spring providing elastic force so that the second cylinder rod moves in a direction of being protruded from the second cylinder.

6. The active air skirt device according to claim 1, wherein the skirt housing is located inside the front bumper, and is secured to a front bumper back beam and a front-end module by a plurality of mounting brackets.

7. The active air skirt device according to claim 6, wherein the skirt housing includes:
   a front housing coupled to the mounting brackets; and
   a rear housing coupled to the front housing so that a housing space having an open bottom is defined between the front housing and the rear housing,
   and wherein the first skirt is mounted so as to move vertically using the housing space.

8. The active air skirt device according to claim 4, wherein the first skirt includes:
   a rear skirt, to which a lower end of the first cylinder rod is coupled; and
   a front skirt coupled to the rear skirt so that a skirt space having an open bottom is defined between the front skirt and the rear skirt,
   and wherein the second skirt is mounted so as to move vertically using the skirt space.

9. The active air skirt device according to claim 1, wherein the controller is configured to receive a signal from a speed sensor and control operation of the actuator.

10. The active air skirt device according to claim 1, wherein the actuator is a DC motor.

11. The active air skirt device according to claim 1, wherein the power transmission mechanism includes:
    a worm gear coupled to the actuator;
    a worm wheel gear tooth-engaged with the worm gear;
    a reduction gear tooth-engaged with the worm wheel gear;
    an output gear tooth-engaged with the reduction gear;
    an output shaft coupled to a center of the output gear;
    a rotating rod coupled to the output shaft and having blades extending in opposite directions from the output shaft; and
    a plurality of skirt cables, each having one end coupled to the blades of the rotating rod and the other end coupled to the second skirt after passing through the skirt housing and the first skirt.

12. The active air skirt device according to claim 11, wherein the actuator housing is secured to the skirt housing, the actuator is secured to the actuator housing, and the worm gear, the worm wheel gear, the reduction gear, the output gear and the output shaft are rotatably mounted.

13. The active air skirt device for a vehicle according to claim 11, wherein an axial center of the output shaft is located in the middle of the skirt housing in a lateral direction, and
   the skirt cables are formed to have the same length from one end coupled to the blades of the rotating rod to the other end coupled to the second skirt.

14. The active air skirt device according to claim 11, wherein the number of skirt cables coupled to one of the blades of the rotating rod is the same as the number of skirt cables coupled to a remaining one of the blades.

\* \* \* \* \*